US007093589B2

(12) United States Patent
Sorersen et al.

(10) Patent No.: US 7,093,589 B2
(45) Date of Patent: Aug. 22, 2006

(54) APPARATUS FOR INCREASING INDUCTION AIR FLOW RATE TO A TURBOCHARGER

(75) Inventors: John Christian Sorersen, Deaborn, MI (US); James John Kempf, Canton, MI (US); Ryan E. Grimes, Deaborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/755,288

(22) Filed: Jan. 8, 2004

(65) Prior Publication Data

US 2005/0150483 A1 Jul. 14, 2005

(51) Int. Cl.
F02B 33/00 (2006.01)
F02B 33/44 (2006.01)
O02M 37/00 (2006.01)
F01D 1/02 (2006.01)
B62D 61/02 (2006.01)
F02B 37/00 (2006.01)

(52) U.S. Cl. .............. 123/559.1; 123/511; 123/406.69; 123/25 A; 415/205; 415/206; 415/118; 415/119; 60/605.1; 181/224; 181/229

(58) Field of Classification Search ............... 60/605.1, 60/600; 123/559.1, 511, 184.54, 184.57, 123/198 E, 406.69; 415/119, 205, 206, 118; 181/276, 229, 249
See application file for complete search history.

(56) References Cited

U.S. PATENT DOCUMENTS

| | | | |
|---|---|---|---|
| 3,735,782 A | 5/1973 | Strscheletzky | |
| 4,142,494 A * | 3/1979 | Negri et al. ........... | 123/406.69 |
| 4,227,544 A | 10/1980 | Luckenbill | |
| 4,246,752 A | 1/1981 | Tryon ......................... | 60/605.1 |
| 4,367,662 A * | 1/1983 | Greene .................... | 123/559.1 |
| 4,411,224 A * | 10/1983 | Goodman ................. | 123/25 A |
| 4,421,455 A * | 12/1983 | Tomren ..................... | 415/119 |
| 4,440,712 A | 4/1984 | Imgram | |
| 4,475,868 A | 10/1984 | Renger ...................... | 415/206 |
| 4,512,716 A | 4/1985 | McHenry et al. ........... | 415/205 |
| 4,513,725 A * | 4/1985 | Minami et al. ............. | 123/511 |
| 4,540,338 A | 9/1985 | Pukkila | |
| 4,676,717 A | 6/1987 | Willyard, Jr. et al. ....... | 415/206 |
| 4,677,828 A | 7/1987 | Matthews et al. | |
| 4,760,703 A * | 8/1988 | Minami et al. ............ | 60/605.1 |
| 4,828,457 A | 5/1989 | Bauer et al. | |
| 4,850,797 A | 7/1989 | Benson ...................... | 415/205 |
| 4,864,859 A | 9/1989 | Jensen | |
| 4,986,732 A | 1/1991 | Stock et al. | |
| 4,995,645 A | 2/1991 | Pausch | |
| 5,036,668 A | 8/1991 | Hardy | |

(Continued)

FOREIGN PATENT DOCUMENTS

EP 280121 A2 * 8/1988 .............. 123/559.1

(Continued)

*Primary Examiner*—Thai-Ba Trieu
(74) *Attorney, Agent, or Firm*—Brinks Hofer Gilson & Lione

(57) ABSTRACT

A system that enables enhanced air flow to the air intake of an internal combustion engine having a turbocharger is disclosed. The air induction system includes a plenum or expansion chamber located within the area directly in front of the inlet of the turbocharger. Alternatively, the air induction system may include a diffuser and/or an expansion chamber for reducing the velocity of the air flow within the clean air duct in an area directly in front of the inlet of the turbocharger.

25 Claims, 7 Drawing Sheets

U.S. PATENT DOCUMENTS

| | | |
|---|---|---|
| 5,079,921 A | 1/1992 | McCandless et al. |
| 5,106,397 A * | 4/1992 | Jaroszczyk et al. ......... 181/276 |
| 5,159,913 A | 11/1992 | Furuya |
| 5,191,789 A | 3/1993 | Furuya |
| 5,203,674 A | 4/1993 | Vinciguerra |
| 5,207,559 A | 5/1993 | Clevenger et al. |
| 5,251,597 A | 10/1993 | Smith et al. |
| 5,261,236 A * | 11/1993 | Ironside et al. ............... 60/600 |
| 5,269,650 A | 12/1993 | Benson |
| 5,335,501 A | 8/1994 | Taylor |
| 5,370,360 A | 12/1994 | Buckley |
| 5,586,861 A * | 12/1996 | Berger ........................ 415/118 |
| 5,590,916 A | 1/1997 | Liu |
| 5,615,554 A * | 4/1997 | Gobert ........................ 181/249 |
| 5,740,774 A | 4/1998 | Kennedy ................ 123/198 E |
| 5,769,388 A | 6/1998 | Welker |
| 5,852,398 A | 12/1998 | Helman |
| 5,865,153 A | 2/1999 | Matsumoto |
| 5,941,221 A | 8/1999 | Marooco et al. |
| 5,979,013 A * | 11/1999 | Beckey et al. ............. 181/229 |
| 5,996,525 A | 12/1999 | Gray |
| 6,155,223 A | 12/2000 | Miazgowicz |
| 6,158,082 A * | 12/2000 | Beckey et al. ............. 181/224 |
| 6,205,786 B1 | 3/2001 | Hasler |
| 6,233,935 B1 | 5/2001 | Kahlon et al. ............. 60/605.1 |
| 6,314,949 B1 | 11/2001 | DeGrazia, Jr. et al. |
| 6,321,538 B1 | 11/2001 | Hasler |
| 6,390,142 B1 | 5/2002 | Naito |
| 6,418,900 B1 | 7/2002 | Itou ........................ 123/84.59 |
| 6,418,916 B1 | 7/2002 | Newmann et al. |
| 6,422,192 B1 | 7/2002 | Bloomer ................ 123/184.57 |
| 6,471,475 B1 | 10/2002 | Sasu et al. |
| 6,474,318 B1 | 11/2002 | Jones et al. ................. 123/564 |
| 6,488,470 B1 | 12/2002 | Owczarek |
| 6,502,540 B1 | 1/2003 | Smith |
| 6,520,738 B1 * | 2/2003 | Sheoran et al. ............. 415/205 |
| 6,543,429 B1 | 4/2003 | Osakabe et al. |
| 2002/0192073 A1 | 12/2002 | Japikse |

FOREIGN PATENT DOCUMENTS

| | | |
|---|---|---|
| WO | WO 9730276 A1 * | 8/1997 |

* cited by examiner

APPARATUS FOR INCREASING INDUCTION AIR FLOW RATE TO A TURBOCHARGER

FIELD OF THE INVENTION

The present invention relates generally to air induction systems. More particularly, the invention relates to a compact air induction system for increasing induction air flow rate to a turbocharger.

BACKGROUND OF THE INVENTION

An internal combustion engine typically includes an air induction system with which air is introduced into an intake manifold assembly. In contrast, the air induction system of a turbocharged engine delivers induction air to the impeller of the turbocharger compressor instead of directly to the intake manifold assembly of the engine.

Prior turbocharged induction systems exhibit problems related to the loss of air induction system pressure head. Common attempts to minimize air induction system head loss include the use of short-length air induction systems, large diameter ducting, or ducting with as few directional changes as possible. However, these solutions are not always possible due to the placement of the engine relative to the surrounding vehicle packaging. Additionally, within the design of the system, certain geometry can be used to minimize flow losses, including diffusers and expansion chambers, at a location where flow must pass through a bend or a bell-mouth transition located within the clean air duct upstream of the inlet to the turbocharger.

A diffuser can be utilized to increase the static pressure of fluid passing through the system. Typical conical diffusers provide for a gradual conical expansion of the area encompassed by a system, the rate of area expansion being determined by what is known in the art as the "cone angle."

Additionally, an expansion chamber or plenum may also be utilized to achieve similar results, under certain conditions. The plenum may encompass an expansion or area increase intended to reduce velocity in order to recover the pressure head of the flow. As air or fluid flow enters the plenum, a reduction in flow velocity occurs. The velocity reduction results in the kinetic energy of the fluid being converted to a static pressure rise due to the conservation of linear momentum and the conservation of angular momentum when swirl is present. Due to the static pressure rise, expansion chambers must be carefully designed to avoid increasing overall head loss.

Furthermore, a bell-mouth transition at the inlet of the turbocharger can be utilized to reduce the amount of head loss and restriction generated as the induction air enters the inlet of the turbocharger.

Although the use of a single approach, such as either a diffuser, an expansion chamber, or a bell-mouth transition, to reduce static pressure losses is well-known, these three features have not been combined in the prior art to obtain the lowest possible turbocharger entrance losses. Moreover, the prior art air induction systems do not utilize a plenum, diffuser, or other means for restoring static pressure head within the area directly in front of the inlet of the turbocharger. Additionally, packaging and manufacturing constraints have often led to design inefficiencies. Prior to the invention, the air induction system would have had to include a plurality of dimensional bends or elbows within the clean air duct to satisfy packaging and design constraints. However, such bends or elbows create a high restriction yielding lower than desired pressure conditions at the inlet of the turbocharger compressor. Furthermore, the prior art air induction systems did not utilize the limited space available after the engine and underhood compartment had already been designed to enhance the flow of induction air.

BRIEF SUMMARY OF THE INVENTION

The present invention alleviates one or more of the shortcomings described above by providing a method and system that enable enhanced air flow to the air intake of an internal combustion engine having a turbocharger. The present invention allows for the reduction of system head loss by minimizing overall restriction within the air induction system.

In one aspect of the present invention, an air induction system includes a clean air duct directing airflow to the inlet of a turbocharger. The clean air duct includes a plenum or expansion volume for reducing flow velocity and minimizing restriction. The plenum is located within the area directly in front of the turbocharger inlet. The clean air duct may further include a diffuser upstream of the plenum, as well as a bell-mouth transition positioned between the plenum and the inlet to the turbocharger. The diffuser and bell-mouth transition are also configured to reduce overall system restriction and head loss.

In another aspect of the present invention, an air induction system includes a clean air duct directing airflow to the inlet of a turbocharger that includes a means for reducing the velocity of the air flow within an area directly in front of the inlet to the turbocharger.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

In accordance with the present invention, a method and system are provided that enable enhanced air flow to the air intake of an internal combustion engine having a turbocharger. In the air induction system provided, various components are integrated into a clean air duct in such a manner as to minimize system head loss.

Figure 1:
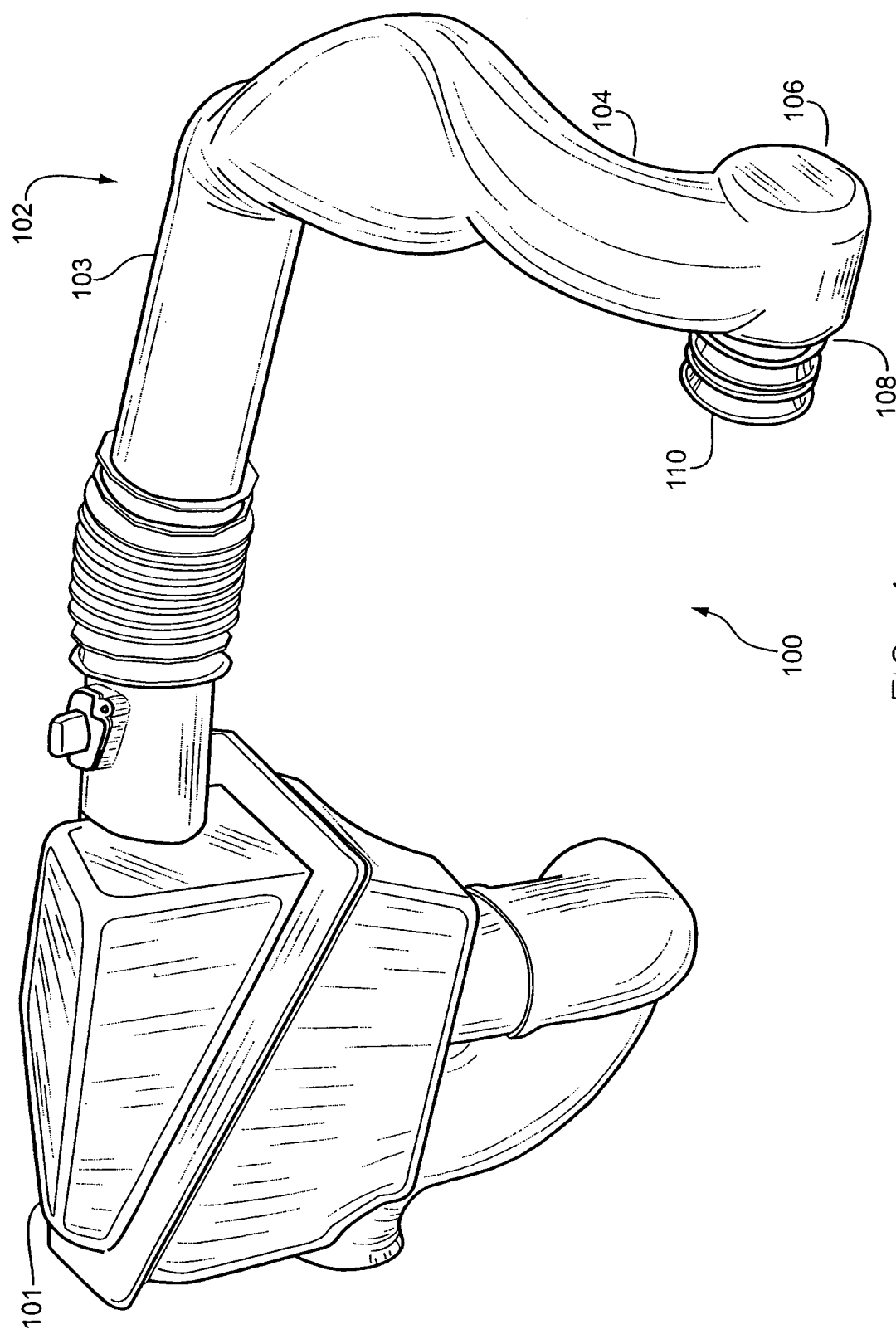
FIG. 1 is a perspective view of one embodiment of the apparatus of the present invention.
Figure 2:
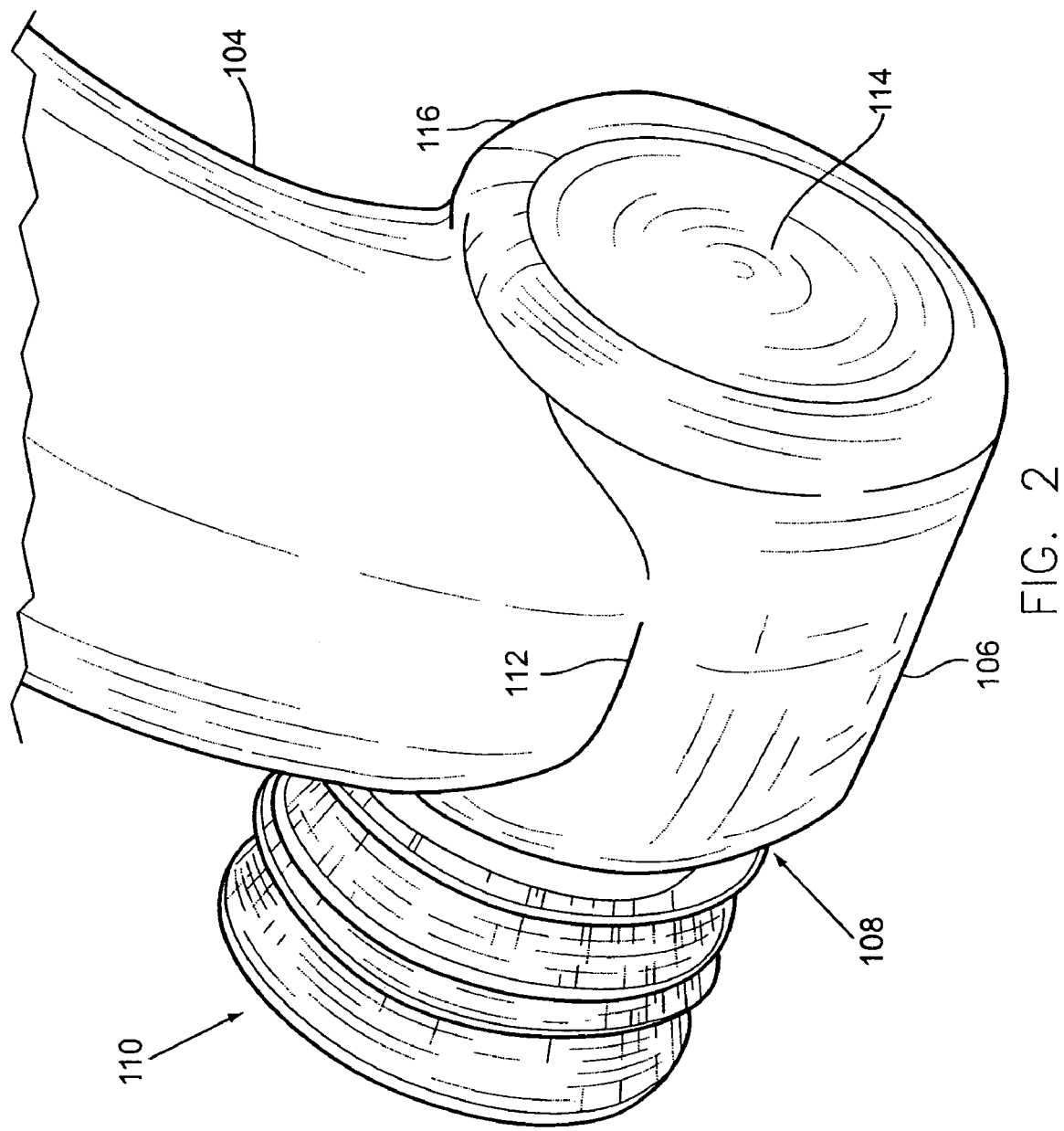
FIG. 2 is an enlarged perspective view of the apparatus.

FIGS. 1 and 2 illustrate perspective views of one embodiment of the air induction system in accordance with the present invention. As shown in FIG. 1, the air induction system 100 for use in an internal combustion engine having a turbocharger includes a clean air duct 102. The clean air duct 102 is operable to deliver induction air flow to the turbocharger inlet 110 from an air filter or cleaner (located within a filter housing 101), which in turn draws air from an air intake (typically located within the engine bay of the motor vehicle (not shown)). The clean air duct 102 illustrated integrates a diffuser 104, a plenum 106, a bell-mouth transition 108, and the turbocharger inlet 110 and enhances the flow of induction air at the turbocharger inlet 110. In the preferred embodiment, the clean air duct 102 upstream of the diffuser 104 is configured to have a clean air tube 103 with an inner diameter of 70 mm, although other sized diameters could be used.

FIG. 2 is an enlarged view of the diffuser 104, the plenum 106, the bell-mouth transition 108, and the turbocharger inlet 110. The plenum 106 is provided within the clean air duct 102 in an area directly in front of the turbocharger inlet 110 and replaces one or more bends or elbows within the clean air duct 102 that would otherwise be present. Such bends or elbows almost always create a high restriction flow path, which reduces the flow rate of induction air. The juxtaposition illustrated in FIG. 1 among the diffuser 104, the plenum 106, and the accompanying clean air duct 102 effectuates a 180 degree change in the direction of the flow of induction air within the clean air duct 102 with a minimum of system head loss.

FIG. 2 further illustrates that the plenum 106 is located within the clean air duct 102 downstream of the diffuser 104. Specifically, the plenum 106 is in direct communication with the diffuser 104. Additionally, the diffuser 104 connects to the plenum 106 along the majority of the length of the cylindrical wall 112 of the plenum 106. As illustrated in FIG. 1, the juxtaposition of the outlet of the diffuser 104 with the plenum 106 results in a 90 degree change in the direction of the flow of induction air within the clean air duct 102.

Figure 3:
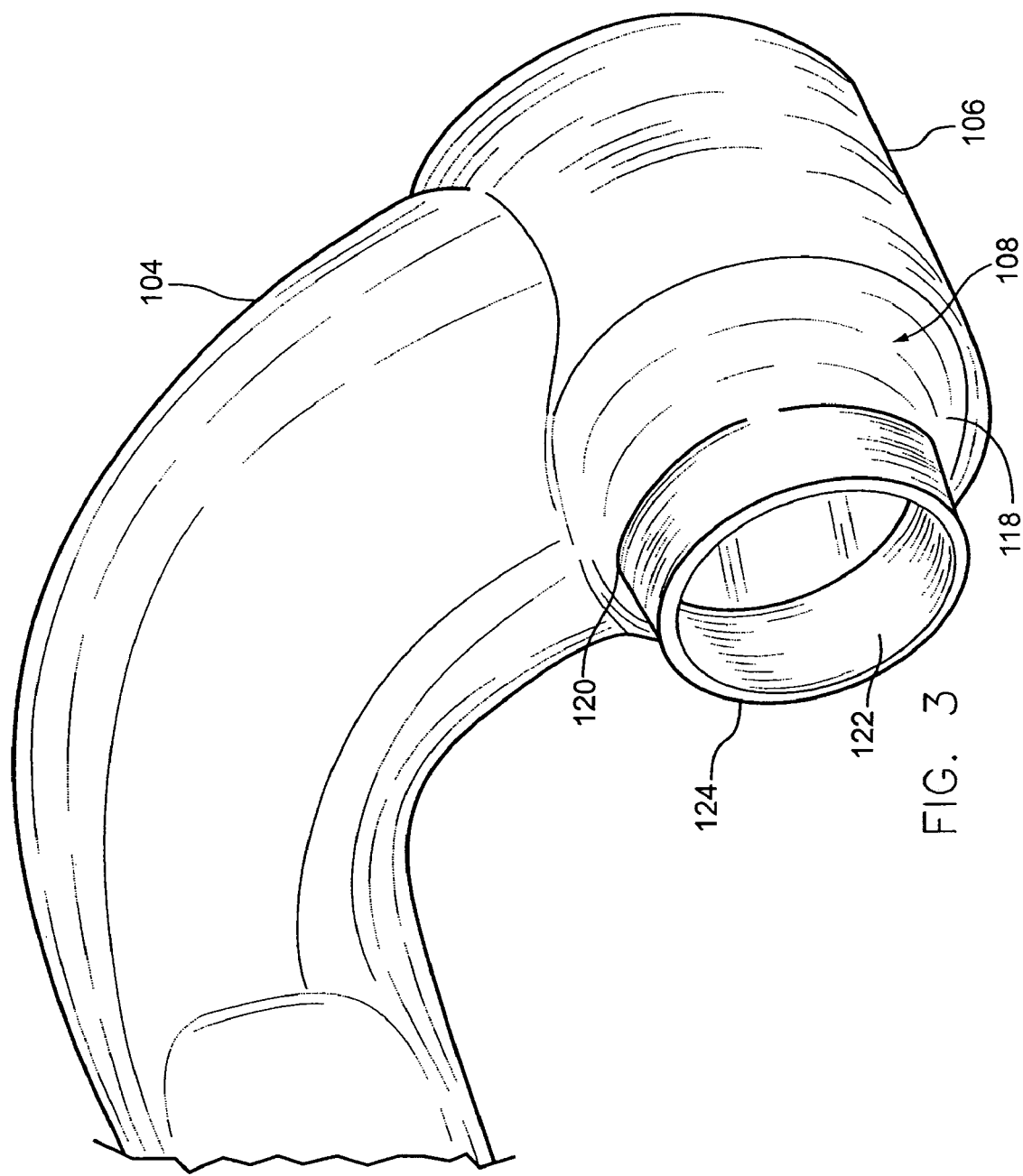
FIG. 3 is an alternate perspective view.

Additionally, the plenum 106 is located within the clean air duct 102 upstream of the bell-mouth transition 108 and the turbocharger inlet 110. As shown in FIG. 3, the bell-mouth transition 108 is configured to reduce the cross-sectional area encompassed by the plenum 106. The bell-mouth transition 108 includes a transition tube 122 having a transition tube inlet 120 and a transition tube outlet 124.

As illustrated in FIG. 2, the turbocharger inlet 110 is configured to be circular in shape. Accordingly, the bell-mouth transition tube outlet 124 is also configured to be circular in shape, as shown in FIG. 3. Additionally, the radius of the circular interior surface of the bell-mouth transition tube 122 may range from approximately 3 to approximately 30% of the effective diameter of the turbocharger inlet 110. However, optimal results occur when the radius is approximately 20% of the effective diameter of the turbocharger inlet 110. In a preferred embodiment the diameter of the bell-mouth transition tube 122 is 53.0 mm.

Figure 4:
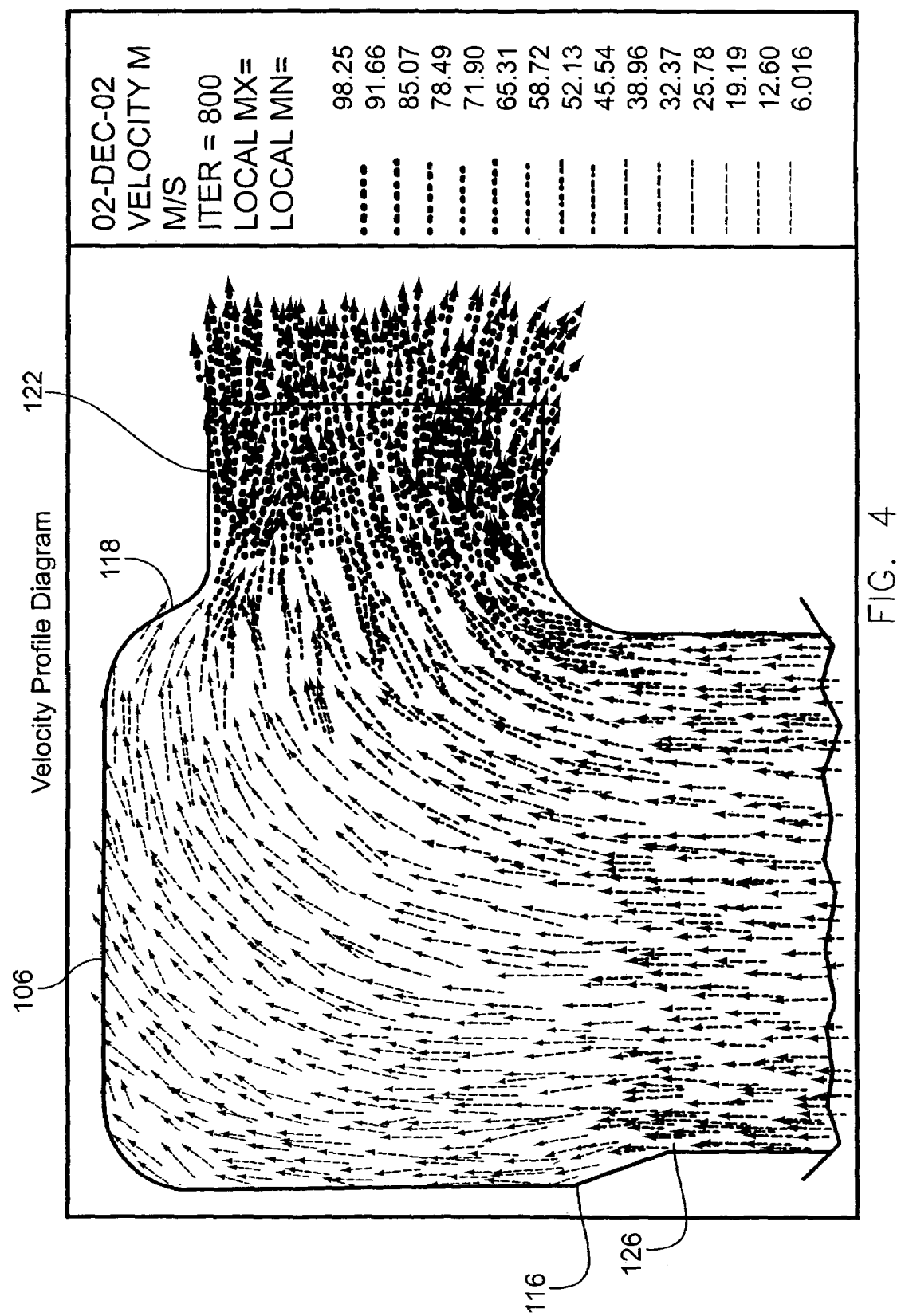
FIG. 4 is a cross-sectional view of the velocity profile through the plenum of one embodiment of the present invention.

As illustrated in FIG. 4, the overall operation of the plenum 106 is described as follows. The plenum 106 provides a cross-sectional area increase within the clean air duct 102 which reduces overall restriction by not forcing the flow of induction air through a particular path (as shown in FIG. 4). The induction air flow enters the plenum 106 directly from a diffuser outlet 126. The plenum 106 is configured to increase the cross-sectional area encompassed by the clean air duct 102. This increase in the cross-sectional area encompassed by the clean air duct 102 results, in part, from the outward expansion of the inner surface of the plenum 106 between the diffuser outlet 126 and the plenum inlet 116, as shown in FIG. 4. FIG. 2 illustrates an exterior view of the outward expansion of the plenum 106 at the plenum inlet 116. The gradual increase in the area encompassed by the clean air duct 102 produces a reduction in the induction air flow velocity within the expansion volume, or plenum 106. In a preferred embodiment, the cross-sectional area of the clean air duct 102 increases from 4729.48 mm$^2$ at the diffuser outlet 126 to a maximum of approximately 7482 mm$^2$ at the center of the plenum 106. Moreover, in the preferred embodiment, the maximum horizontal cross-sectional area of the plenum 106, which is the cross-sectional plane that is perpendicular to the axis of symmetry of the diffuser outlet 126, is the horizontal plane of FIG. 3 that would be located at the vertical center or mid-point of the plenum 106.

The reduction in velocity within the plenum 106 is especially important as restriction and head loss are proportional to velocity squared, as evidenced by the well known Darcy-Weisbach equation. In particular, the plenum 106 illustrated in FIG. 2 is configured to encompass a volume such that the reduction of the induction air flow velocity within the plenum 106 results in optimal engine performance. For the plenum 106 illustrated, optimal results are achieved when the velocity of the induction air flow within the plenum 106 is reduced to less than 75 m/s, as shown in FIG. 4. However, depending upon engine application, other embodiments may vary the volume of the plenum 106 to achieve maximum engine output performance.

Figure 5:
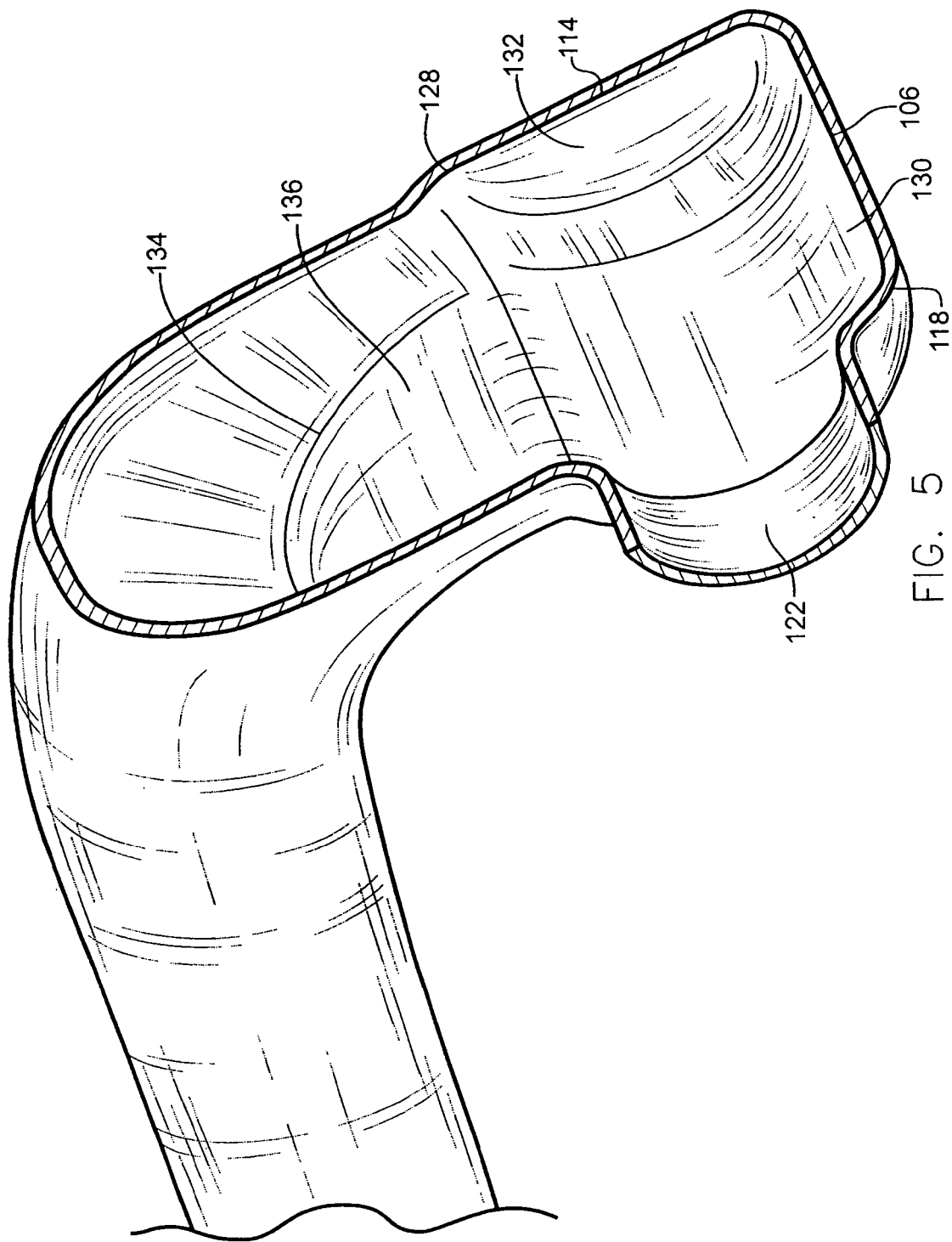
FIG. 5 is an interior view of one embodiment of the apparatus of the present invention.

The interior of the plenum 106 is configured to be cylindrical or tubular in shape, as illustrated in FIG. 5 by the inner circular surface 130 of the plenum 106. FIG. 5 further illustrates that the radius of the interior of the plenum 106 is constant such that the longitudinal cross-sectional area, which is perpendicular to the axis of symmetry of the plenum 106, encompassed by the expansion volume or plenum 106 is uniform lengthwise. In a preferred embodiment, the inner radius of the plenum 106 is 43.5 mm.

The longitudinal cross-sectional area encompassed by the plenum 106 is terminated axially on the side of the plenum 106 that is opposite the bell-mouth transition inlet 118 by a plenum wall 114, as illustrated in FIG. 2. In a preferred embodiment, the interior distance from the plenum wall 114 to the bell-mouth transition inlet 118 is 86.0 mm.

As shown in FIG. 5, the plenum inlet 128 provides for an outward expansion of the plenum 106 which culminates with the plenum wall 114. The interior surface of the plenum inlet 128 connects the plenum wall 114 with the inner circular surface 130 of the plenum 106 via a convex or outward curving surface. Additionally, this convex interior surface of the plenum inlet 128 is smooth.

The plenum wall 114 is perpendicular to the axis of symmetry of the plenum 106 and forms a barrier to and contributes to the redirection of the flow of induction air within the plenum 106, as illustrated in FIG. 4. The interior of the plenum wall 114 is a smooth, flat surface 132, which minimizes system head loss generated along the surface of the plenum wall 114. The inner circular surface 130 of the plenum 106 is smooth, as well, which further minimizes system head loss generated along the inner circular surface 130 of the plenum 106.

The induction air flow exits the plenum 106 by passing through the bell-mouth transition inlet 118 and into the bell-mouth transition tube 122. As illustrated in FIG. 4, the induction air flow velocity increases as it passes through the bell-mouth transition inlet 118 and into the bell-mouth transition tube 122. From the inner circular surface 130, the bell-mouth transition tube inlet 118 exhibits a smooth, concave, or inward bending, interior surface. In a preferred embodiment, the smooth, concave interior surface of the bell-mouth transition inlet 118 is circular in cross section and has a 10.6 mm bell-mouth radius.

The increase in induction air flow velocity within the bell-mouth transition tube 122 results from the decrease in the cross-sectional area encompassed by the clean air duct 102. As shown in FIG. 5, the reduction in the cross-sectional area encompassed by the clean air duct 102 is created by the juxtaposition of the plenum 106, the bell-mouth transition inlet 118, and the bell-mouth transition tube 122. In a preferred embodiment, the bell-mouth transition tube 122 has a cylindrical interior with a constant inner radius of 26.5 mm, such that the longitudinal cross-sectional area of the bell-mouth transition tube 122 is constant.

FIG. 2 further illustrates that the plenum 106 discharges the air flow through the bell-mouth transition 108 located upstream of the turbocharger inlet 110. As illustrated in FIG. 3, the bell-mouth transition tube 122 is a round, circular transition piece that is utilized to connect the plenum 106, via the bell-mouth transition 108, with the turbocharger inlet 110. In a preferred embodiment, the cross-sectional area encompassed by the bell-mouth transition tube 122 is constant as the induction air flows from the bell-mouth transition tube inlet 120 to the bell-mouth transition outlet 124. In a preferred embodiment, the combined length of the bell-mouth transition inlet 118 and the bell-mouth transition tube 122 is 33.5 mm.

Figure 6:
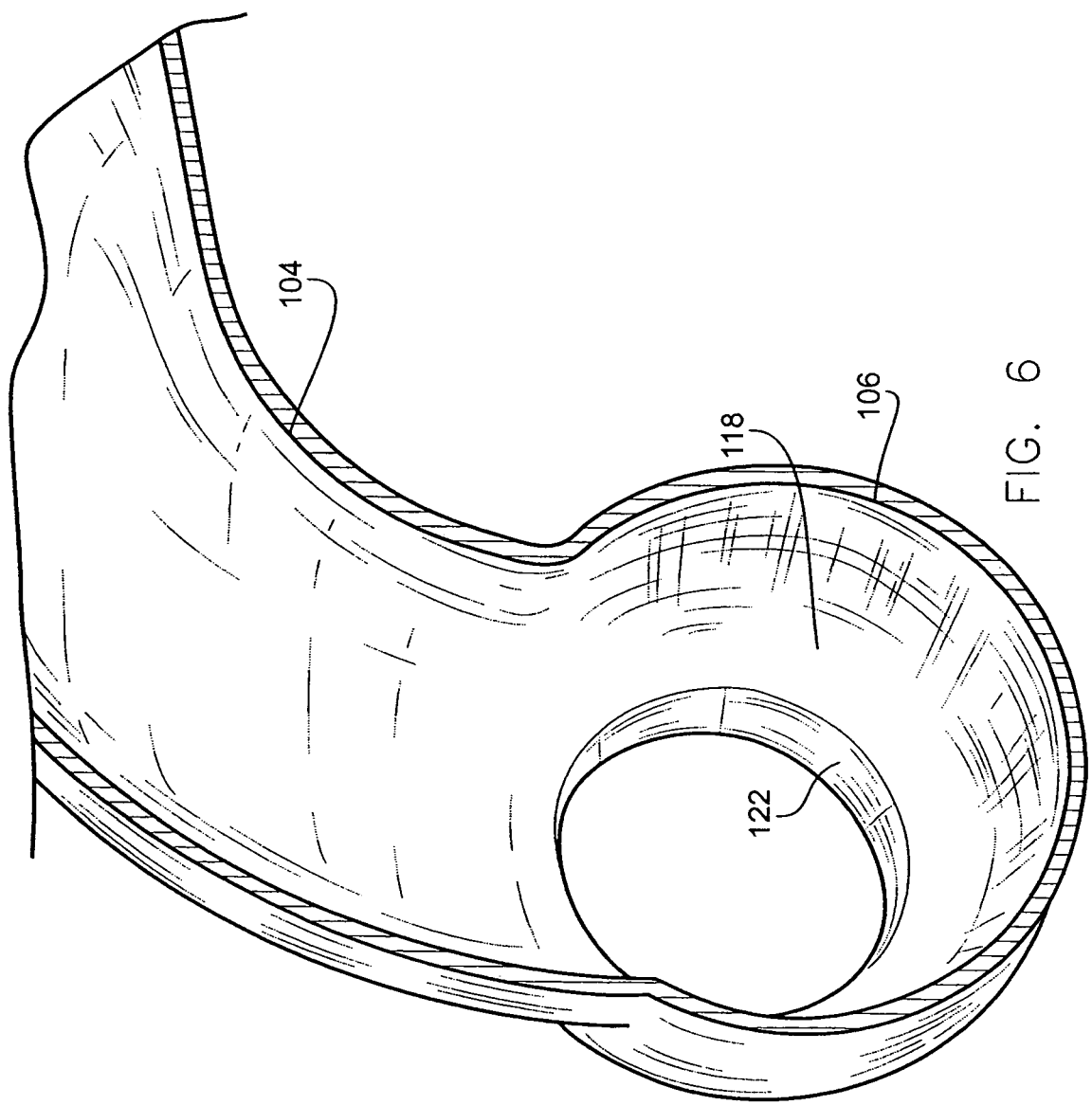
FIG. 6 is an interior view from a different perspective of one embodiment.

FIG. 5 shows one perspective of the smooth inner surface of the bell-mouth transition tube 122. FIG. 6 provides an alternate perspective of the interior surface of the bell-mouth transition tube 122. The interior surface of the bell-mouth transition tube 122 illustrated is configured to have a smooth, circular inner surface to enhance the flow of air at the turbocharger inlet 110. The circular shape and smooth inner surface of the bell-mouth transition tube 122 is particularly important to minimizing system restriction and head loss that would otherwise be generated as induction air flows through the bell-mouth transition tube 122.

FIG. 3 further illustrates that the plenum 106 receives air flow downstream of a diffuser 104. The diffuser 104 illustrated is in communication with the plenum 106. Additionally, the diffuser 104 is configured to be curved along its entire length. In a preferred embodiment, the diffuser 104 has an inner diameter of 70 mm at its entrance. Also in a preferred embodiment, the diffuser outlet 126 has approximately a 77.6 mm inner diameter.

FIG. 5 illustrates that the diffuser 104 is an annular diffuser 134 that radially diverts the flow of induction air and facilitates the replacement of one or more bends or elbows within the clean air duct 102 that would otherwise be present. In a preferred embodiment, the diffuser 104 has a centerline length of 118 mm. The annular diffuser 134 illustrated is configured to possess a smooth inner surface 136. The conical shape and smooth inner surface 136 of the annular diffuser 134 further diminish head loss. Additionally, as illustrated in FIG. 1, the curvature of the diffuser 104 effectuates a 90 degree change in the direction of the flow of induction air within the clean air duct 102.

FIG. 6 illustrates an alternative perspective of the interior surfaces of the diffuser 104, plenum chamber 106, bell-mouth transition inlet 118, and bell-mouth transition tube 122. The smooth interior surface of each of the diffuser 104, plenum 106, bell-mouth transition inlet 118, and bell-mouth transition tube 122 contributes to the reduction in overall system head loss.

Figure 7:
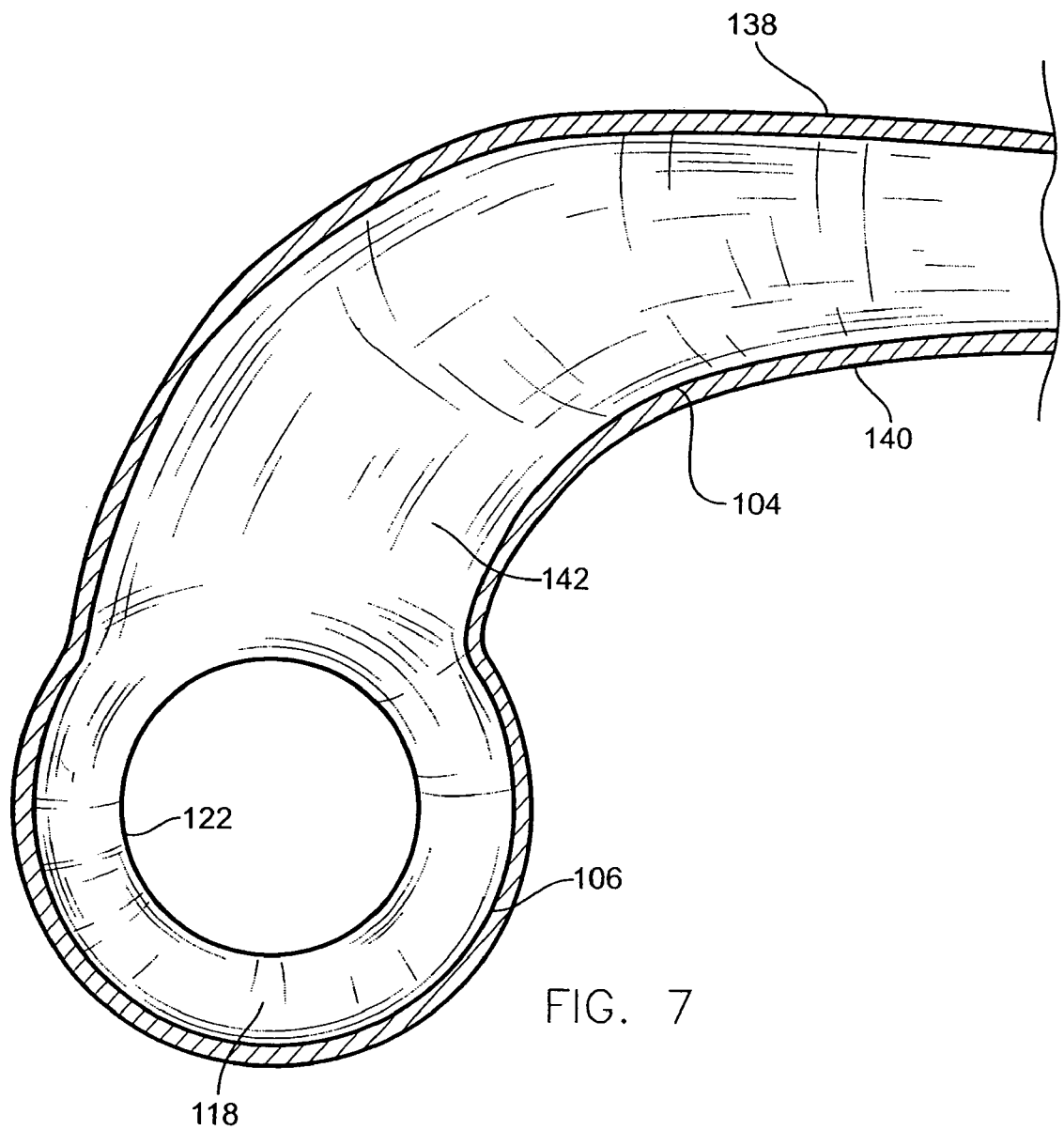
FIG. 7 is a cross-sectional interior view.

Preferably, the interior of the diffuser 104 is configured to be conical in shape. As illustrated in FIG. 7, the cross-sectional area encompassed by the inner conically shaped wall 138, 140 of the diffuser 104 increases longitudinally at a rate established by the cone angle. The increase in the cross-sectional area encompassed by the inner conically shaped wall 138, 140 of the diffuser 104 reduces the velocity of induction air flow and restores static pressure head. The cone angle of the diffuser 104 is variable, preferably between approximately 4 to approximately 16 degrees. However, for the diffuser 104 illustrated, optimal results occur when the cone angle is approximately 12 degrees. Additionally, the interior surface 142 of the diffuser 104 is configured to be smooth, which further minimizes head loss.

Additionally, FIG. 7 provides a view of the cross-section of the plenum 106, bell-mouth transition inlet 118, and bell-mouth transition tube 122. The cross-section of the plenum 106 is circular or tubular in shape, with a constant inner diameter, which is further illustrated in FIG. 5 by the inner circular surface 130 of the plenum 106.

FIG. 7 also illustrates that the interior of the bell-mouth transition inlet 118 effectuates a reduction in the longitudinal cross-sectional area encompassed by the clean air duct 102, as the induction air flows from the plenum 106 and enters the bell-mouth transition tube 122. In a preferred embodiment, the longitudinal cross-sectional area encompassed is reduced from 5941.7 mm$^2$, the longitudinal cross-sectional area of the plenum 106, to 2205.1 mm$^2$, the longitudinal cross-sectional area of the bell-mouth transition tube 122.

The air induction system 100 described herein is effective to reduce the overall restriction and head loss within the system 100. The invention includes a novel placement of a means for reducing the air flow velocity within the air induction system that offers advantages over the prior art. The invention further includes a novel juxtaposition of a diffuser, a plenum, and a bell-mouth transition within an air induction system. By reducing the overall system restriction and head loss, the physical conditions of the air upstream of the entrance to the turbocharger are improved, which prevents engine performance from significantly deteriorating.

While the preferred embodiments of the invention have been described, it should be understood that the invention is not so limited and modifications may be made without departing from the invention. Additionally, while the embodiments here within are discussed for application with a turbocharged air induction system, they may also be adapted for other systems. For example, the embodiments may be adapted for a naturally aspirated engine air induction system by interchanging the naturally aspirated throttle body with the turbocharger. Therefore, the scope of the invention is defined by the appended claims, and all devices that come within the meaning of the claims, either literally or by equivalence, are intended to be embraced therein.

What is claimed is:

1. An air induction system for inducing airflow into the intake of an internal combustion engine having a turbocharger, said system comprising:
   an air filter operable to clean air drawn from an air intake; and
   a clean air channel in fluid communication with an outlet of said air filter so that an airflow is formed therein, said clean air channel having one end directly coupled or connected to an outlet of said air filter and the other end of said clean air channel being directly coupled or connected to an inlet of said turbocharger, said clean air channel having a structure located in front of an inlet to said turbocharger operable to restore pressure head and subsequently increase the velocity of said airflow, wherein the structure comprises means for both restoring pressure head after said airflow has traveled at least a portion of said clean air channel and redirecting said airflow at least approximately 90 degrees from a direction of said airflow exiting said outlet of said air filter to a direction of said airflow entering said inlet of said; and a bell-mouth transition positioned between said structure and said inlet of the turbocharger, said bell-mouth transition having a bell-mouth outlet connected to said inlet of the turbocharger and defining a cross-sectional area at said bell-mouth outlet that is less than said cross-sectional area of said structure.

2. The air induction system of claim 1, wherein said bell-mouth transition has a radius ranging from approximately 3 to approximately 30% of an effective diameter of said inlet of said turbocharger.

3. The air induction system of claim 1, wherein said bell-mouth transition has a radius of approximately 20% of an effective diameter of said inlet of said turbocharger.

4. The air induction system of claim 1, wherein said means for both restoring pressure head after said airflow has traveled at least a portion of said clean air channel and redirecting said airflow at least approximately 90 degrees from a direction of said airflow exiting said outlet of said air filter to a direction of said airflow entering said inlet of said turbocharger comprises a diffuser having a cone angle is in the range of approximately 4 to approximately 16 degrees.

5. The air induction system of claim 4, wherein said cone angle is approximately 12 degrees.

6. The air induction system of claim 4, wherein said bell-mouth transition has a radius ranging from approximately 3 to approximately 30% of an effective diameter of said inlet of said turbocharger.

7. The air induction system of claim 4 wherein said bell-mouth transition has a radius of approximately 20% of an effective diameter of said inlet of said turbocharger.

8. The air induction system of claim 1, wherein said clean air channel redirects said airflow, at least approximately 180 degrees from an outlet of said air filter to said inlet of said turbocharger.

9. The air induction system of claim 1, wherein said means for restoring pressure head after said airflow has traveled at least a portion of said clean air channel and redirecting said airflow at least approximately 90 degrees from a direction of said airflow exiting said outlet of said air filter to a direction of said airflow entering an inlet of said turbocharger comprises a diffuser in fluid communication with an expansion chamber.

10. The air induction system of claim 9, wherein said clean air channel further diffuser comprises an angular diffuser in fluid communication with said expansion chamber at approximately a 90 degree angle between a direction of said airflow exiting an outlet of the angular diffuser and a direction of said airflow exiting an outlet of said expansion chamber.

11. The air induction system of claim 9, wherein said system redirects said airflow, at least approximately 180 degrees from said outlet of said air filter to said inlet of said turbocharger.

12. An air induction system for inducing airflow into the intake of an internal combustion engine having a turbocharger, said system comprising:

an air filter operable to clean air drawn from an air intake; and a clean air channel having one end connected with an outlet of said air filter and another end connected with an inlet of the turbocharger so that an airflow is formed therein, said airflow comprises a flow of clean air within said air induction system, said clean air channel having a structure operable to restore pressure head and subsequently increase the velocity of said airflow, wherein the structure comprises:

a diffuser longitudinally having portions defining a smooth bend of said clean air channel that is operable to redirect the direction of said airflow, the diffuser increasing in cross-sectional area from a diffuser inlet to a diffuser outlet;

an expansion chamber in fluid communication with and located downstream of said diffuser, the expansion chamber being configured to divert the flow of said airflow, wherein said airflow is directed to an inlet of said turbocharger said expansion chamber having a cylindrical wall closed at one end by a substantially flat wall and being connected to said diffuser outlet through said cylindrical wall, said expansion chamber also having a cross-sectional area that is greater than a cross-sectional area of said diffuser outlet; and a bell-mouth transition positioned between an expansion chamber outlet and said inlet of the turbocharger, said bell-mouth transition having a bell-mouth outlet connected to said inlet of the turbocharger and defining a cross-sectional area at said bell-mouth outlet that is less than said cross-sectional area of said expansion chamber.

13. The air induction system of claim 12 wherein said bell-mouth transition has a radius ranging from approximately 3 to approximately 30% of an effective diameter of said inlet of said turbocharger.

14. The air induction system of claim 12 wherein said bell-mouth transition has a radius of approximately 20% of an effective diameter of said inlet of said turbocharger.

15. The air induction system of claim 12, wherein said diffuser has an interior that is generally conical in shape and comprises a cone angle that establishes an expansion rate of a cross-sectional area encompassed within said diffuser.

16. The air induction system of claim 15, wherein said cone angle is in the range of approximately 4 to approximately 16 degrees.

17. The air induction system of claim 15, wherein said cone angle is approximately 12 degrees.

18. The air induction system of claim 15 wherein said bell-mouth transition has a radius ranging from approximately 3 to approximately 30% of an effective diameter of said inlet of said turbocharger.

19. The air induction system of claim 18 wherein said cone angle is in the range of approximately 4 to approximately 16 degrees.

20. The air induction system of claim 18, wherein said cone angle is approximately 12 degrees.

21. The air induction system of claim 15 wherein said bell-mouth transition has a radius of approximately 20% of an effective diameter of said inlet of said turbocharger.

22. The air induction system of claim 15, wherein said diffuser is an angular diffuser that redirects said clean induction airflow at least approximately 90 degrees.

23. The air induction system of claim 15, wherein said diffuser and said expansion chamber each redirect the direction of said clean induction airflow within said clean air channel at least approximately 90 degrees.

24. The air induction system of claim 12 wherein said expansion chamber has a cross-sectional area lowering flow velocity through said expansion chamber to less than 75 m/s.

25. The air induction system of claim 12, wherein said clean air channel redirects said airflow, at least approximately 180 degrees from an outlet of said air filter to said inlet of said turbocharger.

* * * * *

UNITED STATES PATENT AND TRADEMARK OFFICE
CERTIFICATE OF CORRECTION

PATENT NO. : 7,093,589 B2 Page 1 of 1
APPLICATION NO. : 10/755288
DATED : August 22, 2006
INVENTOR(S) : John Christian Sorensen et al.

It is certified that error appears in the above-identified patent and that said Letters Patent is hereby corrected as shown below:

On the Title Page

Item (12), replace "Sorersen" with --Sorensen--.

Item (75), replace "Sorersen" with --Sorensen--.

Item (75), replace "Deaborn" with --Dearborn-- (both occurrences).

In the Claims

In column 7, claim 1, line 11, after "entering said inlet of" replace "said;" with --said turbocharger;--.

Signed and Sealed this

Twenty-seventh Day of April, 2010

David J. Kappos
*Director of the United States Patent and Trademark Office*